United States Patent
Chu et al.

(10) Patent No.: US 7,245,114 B2
(45) Date of Patent: Jul. 17, 2007

(54) DC-TO-DC STEP-UP CONVERTER AND CONVERSION METHOD THEREOF

(75) Inventors: Chu Yu Chu, Taipei County (TW); You Min Sun, Taipei County (TW); Mao Cyuan Jian, Taipei County (TW); Shih Jie Liao, Taipei (TW)

(73) Assignee: Advanced Analog Technology, Inc., Hsinchu (TW)

( * ) Notice: Subject to any disclaimer, the term of this patent is extended or adjusted under 35 U.S.C. 154(b) by 94 days.

(21) Appl. No.: 11/181,780

(22) Filed: Jul. 15, 2005

(65) Prior Publication Data

US 2006/0139019 A1 Jun. 29, 2006

(30) Foreign Application Priority Data

Dec. 24, 2004 (TW) ............................... 93140464 A

(51) Int. Cl.
*G05F 1/40* (2006.01)
(52) U.S. Cl. ..................................................... 323/282
(58) Field of Classification Search ................ 323/282, 323/283, 284, 288, 351; 363/59, 60
See application file for complete search history.

(56) References Cited

U.S. PATENT DOCUMENTS 6,492,862 B2 * 12/2002 Nakahara .................... 327/536
6,977,828 B2 * 12/2005 Wada .......................... 363/60

OTHER PUBLICATIONS

A Master Thesis of Graduate Institute of Electrical Engineering, Feng Chia University, Taiwan—Low Current, Pulse-Frequency Modulation Converter.

* cited by examiner

*Primary Examiner*—Adolf Berhane
(74) *Attorney, Agent, or Firm*—Volentine & Whitt, PLLC

(57) ABSTRACT

The present invention discloses a DC-to-DC step-up converter to which a logic control unit is added in order to reduce the ripples of a DC output voltage and improve the power quality. The converter of the present invention comprises a step-up circuit, a ring oscillator, a divider circuit, a PFM (pulse frequency modulation) comparator and a logic control unit. The step-up circuit is used to step up a source voltage to generate a DC output voltage. The ring oscillator is used to generate an oscillator output signal. The divider circuit receives the DC output voltage to generate a feedback voltage. The PFM comparator compares the feedback voltage with a reference voltage to generate a comparator output signal to control outputting of the oscillator output signal. The logic control unit is used to make the conductive period of a MOS transistor in the step-up circuit identical to the high-level period of an output signal of the ring oscillator to reduce the noise and the ripple of the DC output voltage of the converter.

17 Claims, 6 Drawing Sheets

DC-TO-DC STEP-UP CONVERTER AND CONVERSION METHOD THEREOF

BACKGROUND OF THE INVENTION

1. Field of the Invention

The present invention relates to a converter and a conversion method of DC-to-DC step-up, and more particularly to a converter and a conversion method of DC-to-DC step-up, which is based on pulse frequency modulation (PFM). The present invention is especially suitable for applications of low voltage and low current.

2. Description of the Related Art

Recently the development of all consumer electric products such as personal digital assistants (PDAs), smart phones, the Walkman, and so on has focused on seeking a longer operating time. Batteries are developed to meet the requirements of endurance and portability. As we know, the capacity of batteries is limited, and accordingly how to utilize batteries is getting more important. When the required current of internal components in a system decreases, a PFM convert is likely to be the best solution for applications of low load and low current.

In general, there are two methods of implementing a step-up converter using the PFM technique. The first method is to use an output signal of an error amplifier to control the frequency of a voltage-controlled oscillator (VCO). The VCO is designed to be configured with fixed high-level period and adjustable low-level period. The disadvantage of this method is that the frequency of the error amplifier requires compensation. If a compensation circuit is combined in the error amplifier, the area of the error amplifier chip will increase. If the layout of the compensation circuit is outside the error amplifier, an additional pin would be provided to receive the compensation signal.

Referring to FIG. 1, the second method is to use an output signal of a comparator 11 to control an output square wave of a ring oscillator 12. After passing a buffer 13, the output square wave drives a step-up circuit 14. A DC output voltage $V_{out}$ of the step-up circuit 14 is then sent through a feedback path 15 to generate a feedback signal FBO by divided resistors $R_{10}$ and $R_{20}$. The feedback signal FBO is further fed to the comparator 11. When the DC output voltage $V_{out}$ is stable and then the external load suddenly drops, the energy stored in an inductor of the step-up circuit 14 is released to the external load. As a result, noises are induced. The noises are fed through the feedback path 15 and enter the comparator 11, and finally cause ripples i n the output signal of the ring oscillator 12, in which the output signal is originally a square wave. In addition, to obtain a linear operation of a PFM converter, the high-level period of the output square wave of the ring oscillator 12 has to be fixed. If the last square pulse of the output signal is outputted and then a DC output voltage impulse is caused by relief of excessive energy stored in the inductor of the step-up circuit 14, the last square pulse will be cut off (i.e., the high-level period is reduced) and will result in reduction of output energy. Consequently, the DC output voltage $V_{out}$ drops, and ripples occur.

SUMMARY OF THE INVENTION

The objective of the present invention is to provide a converter and a conversion method of DC-to-DC step-up, by adding a logic control unit, to reduce the ripples of the DC output voltage $V_{out}$.

In order to achieve the objective, the present invention discloses a converter of DC-to-DC step-up, which comprises a step-up circuit, a ring oscillator, a divider circuit, a PFM comparator and a logic control unit. The step-up circuit comprises a capacitor, a diode, an output inductor and a MOS transistor (Metal-Oxide-Semiconductor Field Effect Transistor; MOSFET). The step-up circuit is used to step up a source voltage to generate a DC output voltage. The ring oscillator is used to generate an oscillator output signal. The divider circuit, which comprises two resistors, is used to receive the DC output voltage to generate a feedback voltage. The PFM comparator compares the feedback voltage with a reference voltage to generate a comparator output signal to control outputting of the oscillator output signal. The logic control unit, which comprises an auto-reset unit and a signal hold unit, is used to make the high-level period of the oscillator output signal substantially identical to the conductive period of the step-up circuit. Thus, noises and ripples of the DC output voltage are reduced.

As for the conversion method of DC-to-DC step-up, the first is to provide an oscillator output signal. The second is to step up a source voltage by a step-up circuit to generate a DC output voltage. Then the DC output voltage is fed back by a feedback path and is divided to generate a feedback voltage. The next step is to compare the feedback voltage with a reference voltage to generate a comparator output signal, where the comparator output signal is used to control outputting of the oscillator output signal. Further, it is used to control the high-level period of the oscillator output signal so the latter is substantially identical to the conductive period of the step-up circuit. Consequently, noises and ripples are reduced and the stability of the converter is improved.

The converter of DC-to-DC step-up of the present invention utilizes the PFM technique to meet the requirement of low voltage and low current. The converter can be started up at 0.9V with a reference voltage down to 1.4V and the total static current is only 20 µA ($20 \times 10^{-6}$A). Therefore, the converter of DC-to-DC step-up of the present invention could be applied in electrical products such as portable AV equipment and mobile communication apparatus, which require a long operating time, low operating voltage, low power consumption and no temperature effect.

BRIEF DESCRIPTION OF THE DRAWINGS

The invention will be described according to the appended drawings in which.

PREFERRED EMBODIMENT OF THE PRESENT INVENTION

Figure 1:
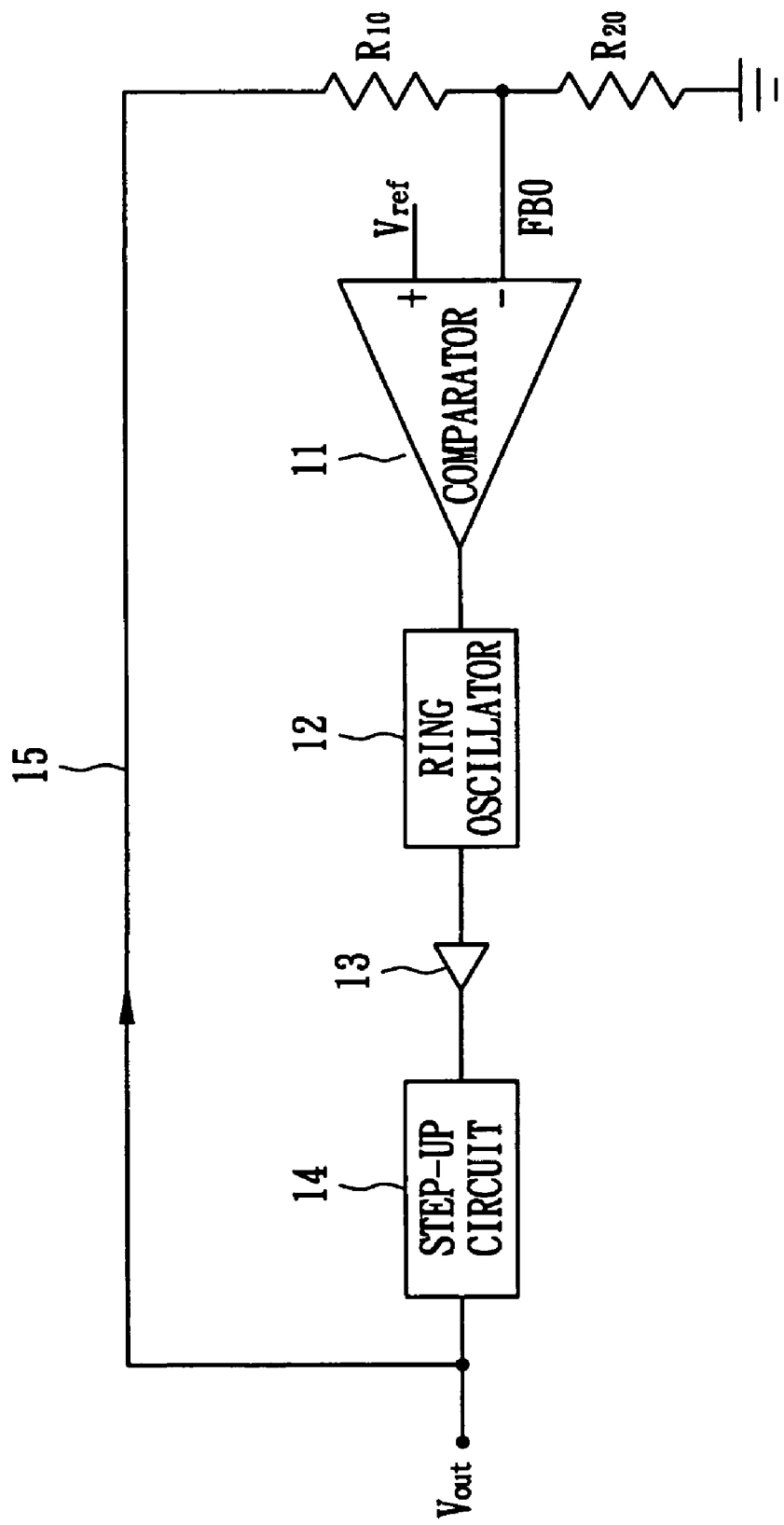
FIG. 1 is an apparatus of DC-to-DC step-up of background art.
Figure 2:
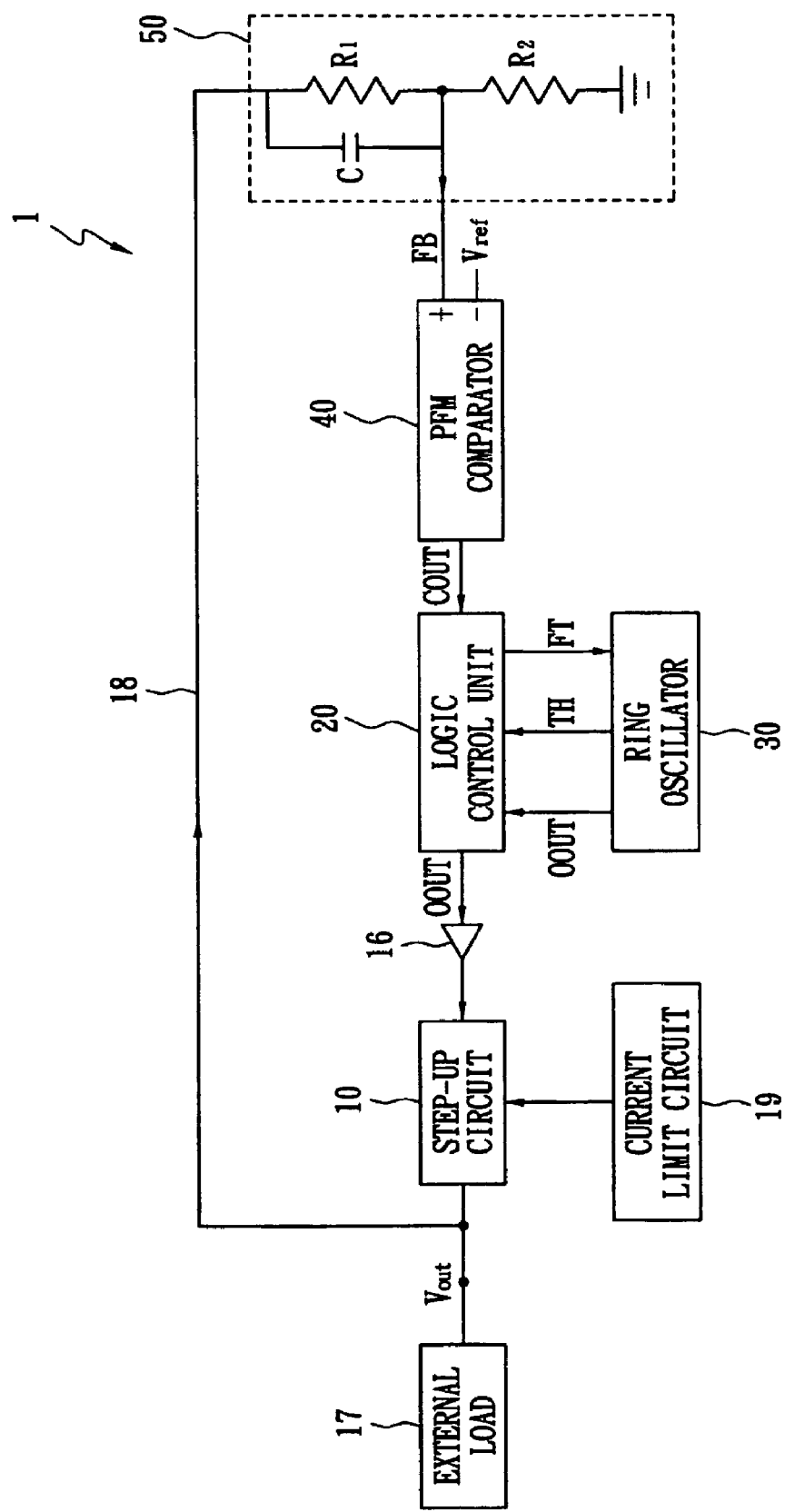
FIG. 2 is a system block diagram of a preferred embodiment of the converter of DC-to-DC step-up of the present invention.

FIG. 2 is a system block diagram of a preferred embodiment of the converter of DC-to-DC step-up 1 of the present invention and partial circuit thereof. The converter of FIG. 2 comprises a step-up circuit 10, a logic control unit 20, a ring oscillator 30, a PFM comparator 40, a divider circuit 50, a current limit circuit 19 and a buffer 16. The ring oscillator 30 is used to generate a continuous square wave OOUT, where the outputting of the continuous square wave OOTU is controlled by the PFM comparator 40 receiving and comparing a feedback signal FB and a reference voltage $V_{ref}$. The logic control unit 20 is utilized to reduce the noise effect and ripples of the DC output voltage $V_{out}$ and to improve the stability of the converter. The current limit circuit 19, which is connected to node LX of the step-up circuit 10 (shown in FIG. 3), detects the voltage of node LX. If the voltage of node LX is over a preset value, the over-current through the MOS transistor 102 is determined, and then the current limit circuit 19 turns off the MOS transistor 102 to a void burning away. The DC output voltage $V_{out}$ of the step-up circuit 10 drives an external load 17 and is sent to a divider circuit 50 through a feedback path 18 to generate a feedback signal FB. The result of comparing the feedback signal FB with the reference voltage $V_{ref}$ determines whether the frequency of the continuous square wave OOTU needs further modulating.

Figure 3:
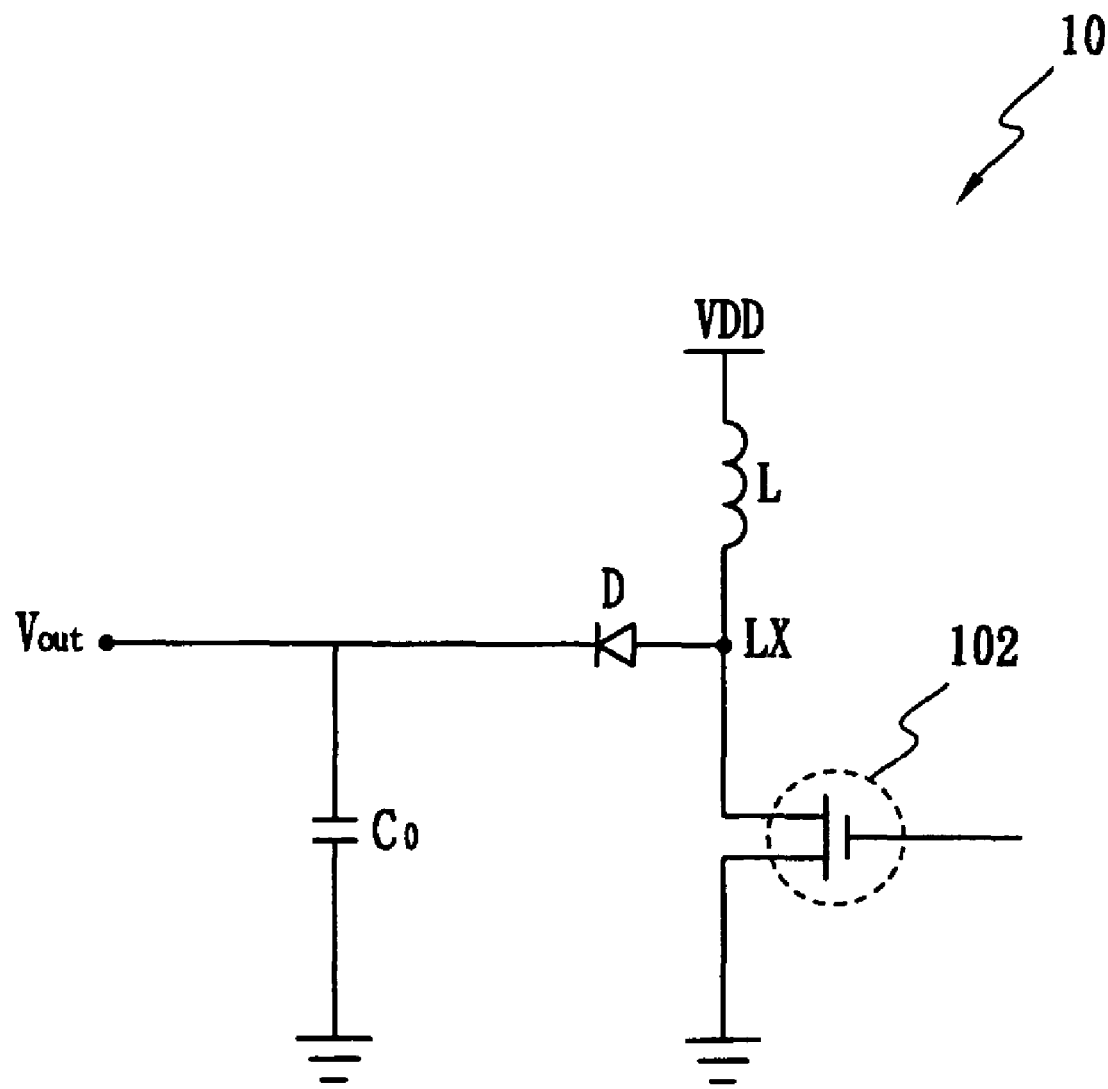
FIG. 3 is an embodiment of the step-up circuit of the converter of DC-to-DC step-up of the present invention.

FIG. 3 is an embodiment of the step-up circuit of the converter of DC-to-DC step-up of the present invention. The step-up circuit 10, which comprises an inductor L, a diode D, a capacitor $C_o$ and a MOS transistor 102, is used to step up a source voltage VDD to generate a DC output voltage $V_{out}$. When the MOS transistor 102 is conductive and the diode D is reversely biased, the voltage across two ends of the inductor L is VDD and the current flowing through the inductor L increases linearly. In this case, the output current is completely provided by the capacitor $C_o$. When the MOS transistor 102 turns non-conductive, the polarity of the inductor L reverses suddenly and thus the diode D changes to be forward-biased and conductive, and the inductor L releases the energy to charge the capacitor $C_o$ and provides a current to the external load 17. The DC output voltage $V_{out}$ is determined by the resistors $R_{10}$ and $R_{20}$ in the divider circuit 50.

Figure 4:
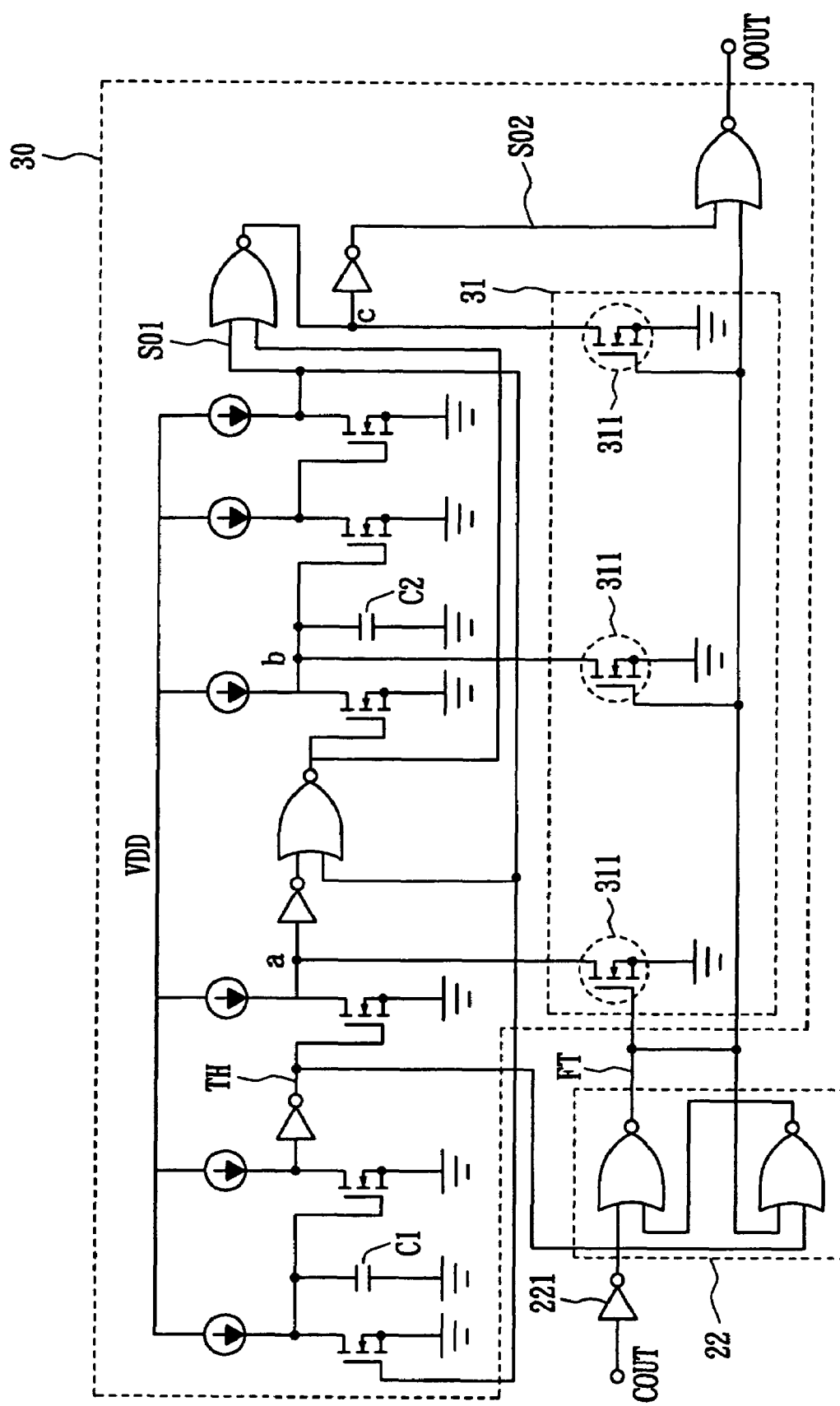
FIG. 4 is a preferred embodiment of the circuits of the ring oscillator and the signal hold unit of the converter of DC-to-DC step-up of the present invention.
Figure 5A:
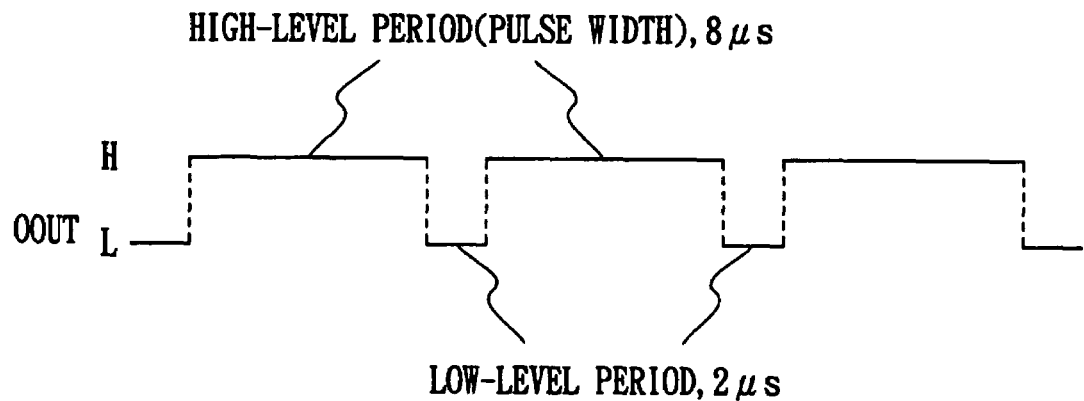
FIG. 5(a) and FIG. 5(b) are timing charts of the output signal of the ring oscillator of the converter of DC-to-DC step-up of the present invention.

FIG. 4 is a preferred embodiment of the circuits of the ring oscillator 30 and the signal hold unit 22 of the converter of DC-to-DC step-up of the present invention. The purpose of the ring oscillator 30 is to allow the converter of DC-to-DC step-up 1 to be operated in low source voltage. The ring oscillator 30 includes a first capacitor C1, a second capacitor C2 and a switch unit 31. A signal hold unit 22, which is included in the logic control unit 20, is connected to the switch unit 31, controls the operation status (on or off) of the ring oscillator 30, confirms the conductive time of the MOS transistor 102 and further prevents the MOS transistor 102 from burning away. An output signal COUT (refer to FIG. 2) from the PFM comparator 40 and a trigger hold signal TH from the ring oscillator 30 enter the signal hold unit 22, which generates a trigger signal FT inputted to the switch unit 31. In the current embodiment, the signal hold unit 22 is a Reset-Set latch (RS latch). The switch unit 31 comprises three NMOS transistors 311. The drain electrode of each NMOS transistor 311 is connected to nodes a, b, c of the ring oscillator 30, respectively. The trigger signal FT from the signal hold unit 22 is sent to the gate electrode of each NMOS transistor 311. When the trigger signal FT is at a high level, the ring oscillator 30 is turned off; that is, the function of the ring oscillator 30 pauses. When the trigger signal FT changes to low level, the ring oscillator 30 returns to normal operation. When the NMOS transistors 311 are non-conductive, all the signals SO1, SO2 and OOUT are continuous square waves. The first and second capacitors C1, C2 determine the low-level period and high-level period of signals SO1, SO2 and OOUT, respectively. Referring to FIG. 5(a), a given example of the signal OOUT, the capacitances of the first and second capacitors C1, C2 are properly selected to make the high-level period (i.e., pulse width) and low-level period of the signal OOUT equal to 8 μ sec. ($8\times10^{-6}$ sec.) and 2 μ sec. ($2\times10^{-6}$ sec.), respectively. Similarly, the low-level period and high-level period of each of signals SO1, SO2 could be determined by the second and first capacitors C2, C1, respectively.

Figure 5B:
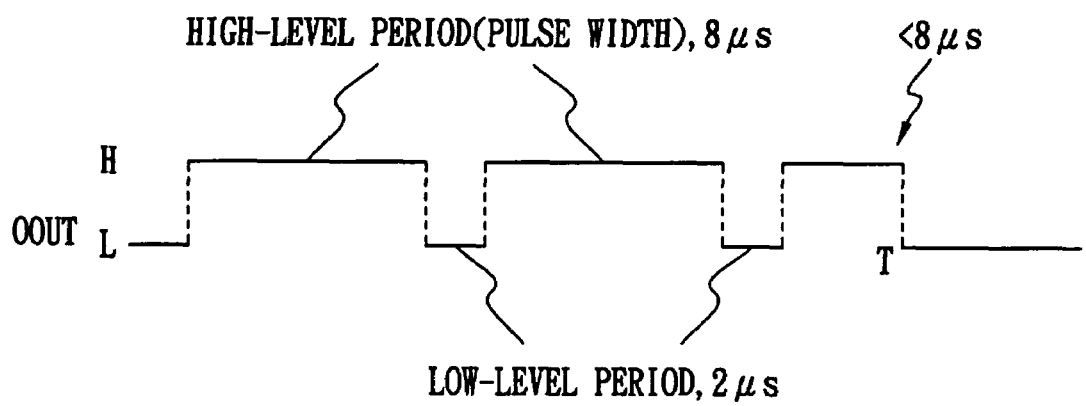

Referring to FIG. 5(b), when the DC output voltage $V_{out}$ of the converter 1 is stable and the external load 17 suddenly drops, the DC output voltage $V_{out}$ is fed back to the PFM comparator 40 through the feedback path 18 and the divider circuit 50 and then is compared with the reference voltage $V_{ref}$. To decrease the DC output voltage $V_{out}$ to smoothly drive the external load 17, the voltage level of signal OOUT changes from high to low at time T, accordingly. That is, the high-level period (or pulse width) of the signal OOUT decreases. As a result, the pulse width of signal OOUT is not fixed and the linear operation of the converter 1 is influenced. To make the pulse width of the signal OOUT fixed, it is necessary to control the ring oscillator 30 properly. The signal hold units 22 receiving the trigger hold signal TH and the inverted signal of the output COUT of the PFM comparator 40 generate the trigger signal FT sent to the switch unit 31 of the ring oscillator 30 (refer to FIG. 4). The configuration of FIG. 4 forces the output signal OOUT of the ring oscillator 30 to turn three NMOS transistors 311 conductive and simultaneously changes the voltage levels of nodes a, b and c in the ring oscillator 30 to low level after passing the high-level period ($8\times10^{-6}$ sec.). Consequently, no continuous square wave is outputted and this makes the MOS transistor 102 of the step-up circuit 10 conductive when the output signal OOUT is in a high-level period. Accordingly, the stability of the converter 1 is improved and the ripples of the DC output voltage $V_{out}$ are reduced.

Referring to FIG. 2 again, the DC output voltage $V_{out}$ of the converter 1 is fed back to the divider circuit 50, and thus the feedback signal FB is generated through the resistors R1 and R2. After comparing the feedback signal FB with the reference voltage $V_{ref}$, the result is used to control the energy accumulation and relief of the inductor L of FIG. 3. When the ring oscillator 30 is stable, whether the energy accumulation and relief of the inductor L of FIG. 3 is linear or not depends on the characteristic of noise resistance of the PFM comparator 40. When the converter 1 is applied in low current circuits, the noise induced by the transition of the output of the converter 1 usually interferes with the reference voltage $V_{ref}$ and makes the output signal COUT of the PFM comparator 40 unstable and consequently causes the MOS transistor 102 of the step-up circuit 10 to turn on and off several times. The result is that the efficiency of the converter 1 decreases and larger ripples occur on the DC output voltage $V_{out}$.

Figure 6:
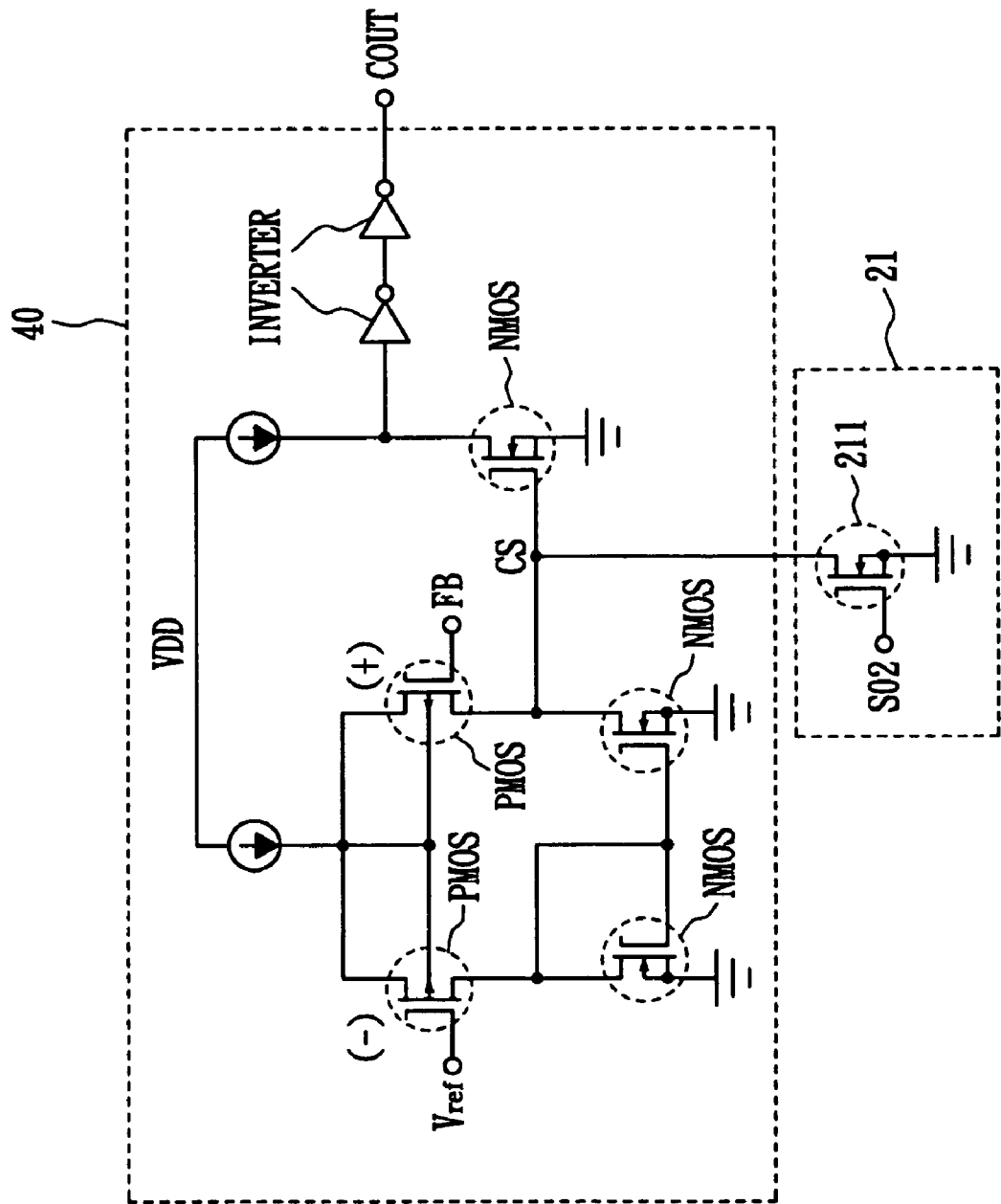
FIG. 6 is an embodiment of the circuits of the PFM comparator and the auto-reset unit of the logic control unit of the converter of the present invention.

FIG. 6 shows an embodiment of the circuits of the PFM comparator 40 and the auto-reset unit 21 of the converter of DC-to-DC step-up 1 of the present invention. The auto-reset unit 21 uses a second oscillator output signal SO2 from the ring oscillator 30 to control the operation of the PFM comparator 40. An embodiment of the auto-reset unit 21 is a NMOS transistor 211. The NMOS transistor 211 uses its drain electrode to connect to node CS of the PFM comparator 40, uses its gate electrode to receive the second oscillator output signal SO2 and uses its source electrode to be grounded. When the second oscillator output signal SO2 is on high level, the PFM comparator 40 is turned off. At this moment, the PFM comparator 20 is forced to turn off so as to reduce the interference of noises in the PFM comparator 40. By the reduction of noise influence mentioned above, the ripples of the DC output voltage $V_{out}$ are thus reduced.

Referring to FIG. 2 again, in conclusion, the converter 1 utilizes the output signal COUT of the PFM comparator 40 to control the frequency of the output signal OOUT of the ring oscillator 30. Then, the voltage level of the output signal OOUT is used to control the periods of conduction and non-conduction of the MOS transistor 102 of the step-up circuit 10 to determine the amount of energy stored or released from the inductor L. The DC output voltage $V_{out}$ is also fed back to the divider circuit 50. After that, the DC output voltage $V_{out}$ is obtained by the ratio of the resistance of resistor R1 to that of resistor R2. For example, if the reference voltage $V_{ref}$ is 1V and the resistance ratio of R2 to R1 is 4, the DC output voltage $V_{out}$ would be 5V. Additionally, a capacitor C could be connected parallel to the resistor R1 to stabilize the feedback signal FB.

The above-described embodiments of the present invention are intended to be illustrative only. Numerous alternative embodiments may be devised by persons skilled in the art without departing from the scope of the following claims.

What is claimed is:

1. A DC-to-DC step-up converter comprising:
   a step-up circuit stepping up a source voltage to generate a DC output voltage;
   a ring oscillator generating an oscillator output signal, the ring oscillator comprising a first capacitor determining a low-level period of the oscillator output signal, a second capacitor determining a high-level period of the oscillator output signal, and a switch unit receiving a trigger signal to control the ring oscillator to output the oscillator output signal;
   a divider circuit receiving the DC output voltage to generate a feedback voltage;
   a pulse frequency modulation (PFM) comparator comparing the feedback voltage with a reference voltage to generate a comparator output signal for controlling outputting of the oscillator output signal; and
   a logic control unit reducing ripples of the DC output voltage, the logic control unit comprising a signal hold unit providing the trigger signal to control the switch unit, and an auto-reset unit controlling the operation of the PFM comparator to reset the comparator output signal automatically.

2. The DC-to-DC step-up converter of claim 1, wherein the divider circuit is connected to the step-up circuit by a feedback path to feed back the DC output voltage.

3. The DC-to-DC step-up converter of claim 1, wherein the oscillator output signal is a continuous square wave.

4. The DC-to-DC step-up converter of claim 1, wherein the step-up circuit comprises an inductor, a diode, a capacitor and a MOS transistor.

5. The DC-to-DC step-up converter of claim 4, wherein the voltage level of the oscillator output signal is high when the MOS transistor is in a conductive state.

6. The DC-to-DC step-up converter of claim 1, wherein the divider circuit comprises two resistors, wherein the resistance ratio of two resistors determines the DC output voltage.

7. The DC-to-DC step-up converter of claim 6, wherein the divider circuit further comprises a capacitor to stabilize the feedback voltage.

8. The DC-to-DC step-up converter of claim 1, wherein the switch unit comprises a plurality of NMOS transistors.

9. The DC-to-DC step-up converter of claim 1, wherein the signal hold unit receives an inverse signal of the comparator output signal and a trigger hold signal from the ring oscillator to generate the trigger signal.

10. The DC-to-DC step-up converter of claim 1, wherein the signal hold unit is a Reset-Set (RS) latch.

11. The DC-to-DC step-up converter of claim 1, wherein the auto-reset unit is a NMOS transistor.

12. The DC-to-DC step-up converter of claim 1, wherein the auto-reset unit is controlled by a signal from the ring oscillator.

13. The DC-to-DC step-up converter of claim 4, further comprising a current limit circuit for turning off the MOS transistor if over-current occurs in the MOS transistor.

14. A method of DC-to-DC step-up conversion comprising:
   providing an oscillator output signal;
   stepping up a source voltage using a step-up circuit to generate a DC output voltage;
   feeding back and dividing the DC output voltage to generate a feedback voltage;
   comparing the feedback voltage with a reference voltage to generate a comparator output signal that is used to control outputting of the oscillator output signal;
   generating a trigger signal using a logic control unit based on a trigger hold signal of a ring oscillator and the comparator output signal to control an operation status of the ring oscillator; and
   controlling a high-level period of the oscillator output signal to be substantially equivalent to a conductive period of the step-up circuit.

15. The method of DC-to-DC step-up conversion of claim 14, wherein the comparator output signal is generated by a PFM comparator.

16. The method of DC-to-DC step-up conversion of claim 14, wherein the oscillator output signal is generated by a ring oscillator.

17. The method of DC-to-DC step-up conversion of claim 14, wherein the controlling step is completed by a RS latch.

* * * * *